UNITED STATES PATENT OFFICE.

JASPER HENRY SELWYN, OF GLOUCESTER CRESCENT, HYDE PARK, ENGLAND.

IMPROVEMENT IN TREATING ORES OF SILVER.

Specification forming part of Letters Patent No. 136,102, dated February 18, 1873.

*To all whom it may concern:*

Be it known that I, JASPER HENRY SELWYN, of Gloucester Crescent, Hyde Park, in the county of Middlesex, Captain, R. N., have invented a new Method of Treating Refractory Ores of Silver, of which the following is a specification:

The chief object of this invention is to extract silver from certain refractory ores of silver to which the processes now commonly employed are, for economic reasons, inapplicable. The class of silver ores to which my invention applies possesses a large percentage of lime, the presence of which enables me, in many cases, to accomplish the disintegration necessary in order that the silver may be attacked by the chlorine without the necessity of stamping or other mechanical means of comminution.

In carrying out my invention, I place the ore in wooden, earthenware, enameled-metal, or other suitable vats constructed for the purpose, and boil the ore in a solution of common salt and muriatic acid in which free chlorine is present. After boiling for a given time, I obtain a clear metallic solution, which I then run into vats, and cause the precipitation of the metal in any well-known or approved manner.

Having now stated generally the nature of my improved method of treatment, I will explain more in detail the means whereby I have been enabled to obtain a good result. The ore, having been broken up or pulverized, is roasted, and is then boiled in a solution of salt and hydrochloric acid with the addition of manganese. The proportions which I have found to give a good result are, salt, one and one-half part, by weight; hydrochloric acid, four and one-half parts; manganese, one part; and water, two parts. These proportions will serve for one part by weight of the calcined silver ore. The boiling of the ore will, in general, require to be maintained for one hour. During the boiling nascent chlorine gas, due to the presence of the manganese, will be diffused through the solution, and a rapid chemical action will be thereby induced. Thus, in about an hour a clear metallic solution will be obtained. This I run off into a vat or other suitable vessel, and the precipitation of the metal I effect by passing sulphureted hydrogen gas into the solution.

Instead of the proportions of the materials above stated I have found that a good result may be obtained by boiling silver ore (previously chloridized by heat with salt, one part) in a concentrated solution of salt and muriatic acid, the bath being composed of salt, two parts; water, two parts; and muriatic acid, one-half part. This mode of treating the silver ore will not, however, be found generally so efficient as when manganese is introduced into the boiling solution.

The metals collected by precipitation in the tanks can be treated by any of the ordinary methods for bringing them into a commercial condition.

By the above process I obtain a much higher percentage of the precious and other metals existing in refractory ores than has heretofore been secured; and, owing to the small cost of the process, I am enabled to treat profitably ores that have hitherto been considered commercially worthless.

Having now set forth the nature of my invention, I wish it to be understood that I do not claim the chlorination of the ores by leaching, roasting, or other well-known processes; but

What I claim is—

The treating of refractory ores of silver by boiling the same in a solution of common salt and hydrochloric acid in presence of free chlorine gas, as described.

J. H. SELWYN.

Witnesses:
  H. K. WHITE,
    *66 Chancery Lane.*
  A. S. BISHOP,
    *66 Chancery Lane.*